July 5, 1927.

W. A. TROUT

PACKING DEVICE

Filed Nov. 9, 1922

INVENTOR,
William A. Trout;
BY
Blakulur Brown
ATTORNEYS.

July 5, 1927.
W. A. TROUT
1,634,891
PACKING DEVICE
Filed Nov. 9, 1922     2 Sheets-Sheet 2
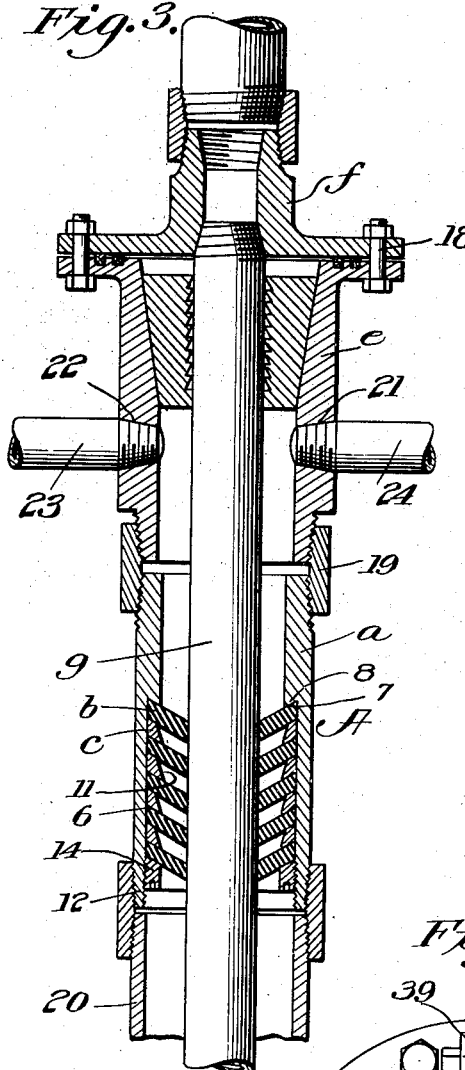
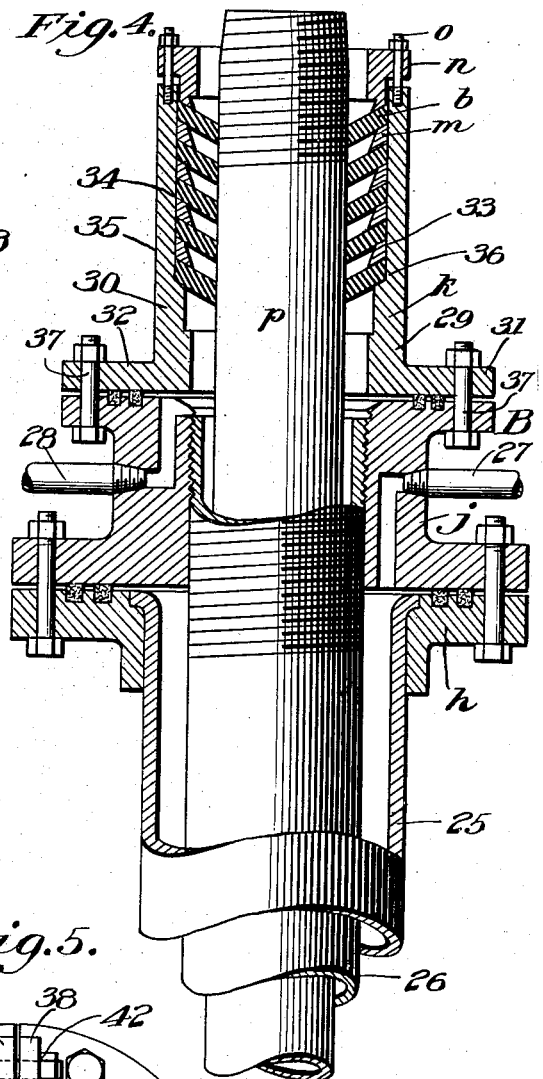
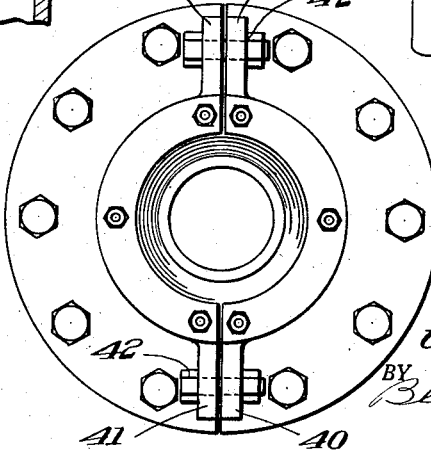
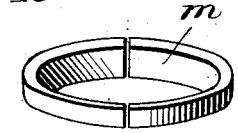
INVENTOR,
William A. Trout;
BY
Blakeslee & Brown
ATTORNEYS.

Patented July 5, 1927.

1,634,891

UNITED STATES PATENT OFFICE.

WILLIAM A. TROUT, OF LONG BEACH, CALIFORNIA.

PACKING DEVICE.

Application filed November 9, 1922. Serial No. 599,748.

This invention relates to packing devices, and particularly to a packing device for use in well apparatus, and the invention has for an object the provision of a packing device which will effectively seal off sudden flow of oil or gas or other fluid during lowering of casing or tubing, or the sealing off of different areas of tubing or casing at any point desired. At the present time it may happen that casing has been lowered in a well hole and that the pump tubing has been lowered within the casing and it is desired to prevent sudden ingress or flow of oil between the pump tubing and the casing, or it may be desired to prevent sudden flow of gas between the tubing and casing. Accordingly I provide packing members adapted to span the space between a string of tubing and the casing, and which packing members are so formed as to provide an effective seal between the tubing and the casing permitting the tubing to move downwardly within the casing with all enlargements, such as collars, to pass by the packing and still maintain the sealed relation as between the casing and the tubing during the passing of enlargements or collars therethrough or thereby. The sealing or packing operates automatically and maintains the interspace between the tubing and casing packed at all times and effectively acts as a check against any movement of fluid or gas between the tubing and casing.

With the above and other objects in view, the invention consists in the novel and useful provision, formation, construction, association, and relative arrangement of parts, members and features, all as shown in certain adaptations in the accompanying drawings, generally described, and finally pointed out in claim.

In the drawings:

Figures 3 and 4 are fragmentary sectional views of adaptations of the invention;

Figure 5 is a top plan view of the device shown in Figure 4; and,

Figures 6 and 7 are perspective views of annular spacers and packing members.

Corresponding parts in all the figures are designated by the same reference characters.

Figures 1, 2:
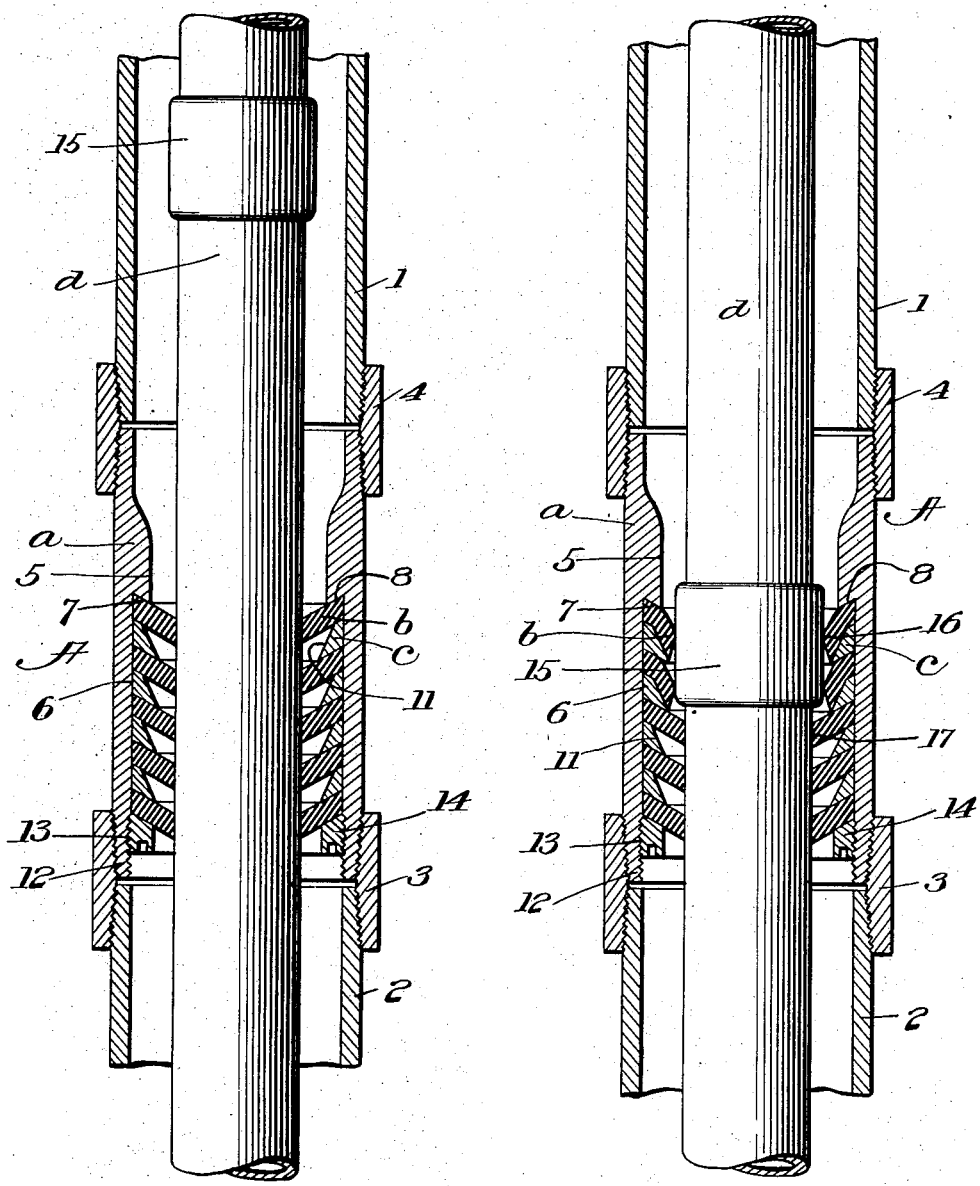
Figure 1 is a conventional vertical section of a string of casing with a tubing member thereof, there being an annular member joined to lengths of said casing, said annular member containing the sealing or packing for effecting a seal between the casing and tubing.
Figure 2 is a view similar to Figure 1 and showing movement of the packing when a collar member carried by the tubing passes therethrough or thereby.

Referring to the drawings, the primary embodiment of the invention is shown in Figures 1 and 2, and in which A designates as an entirety in one embodiment the improved packing device, which packing device may include an annular member $a$ held to casing sections 1 and 2, as by means of collars 3 and 4, said member or body $a$ and the casing sections 1 and 2 being exteriorly screw-threaded for engagement with the collars 3 and 4. The body $a$ may be internally enlarged as shown at 5 and then annularly reduced as shown at 6, so as to effect a step or annular shoulder at 7. This step or annular shoulder 7 has its wall 8 downwardly inclined, and the body $a$ may confine within the same a series of gaskets, packing rings or the like $b$, alternating with spacers $c$. The members $b$ are best illustrated in Figure 6, and it will be noted that said members $b$ are annular and concavo-convex in formation, the top surface 9 being concave and the lower surface 10 being convex. The spacers $c$ may be considered as being trapezoidal in cross section, the inner annular surface 11 being inclined relative to the longitudinal axis of the member $a$. The end as 12 of the body $a$ is threaded internally, as shown at 13, and a jamb nut or other device 14 is received within the body $a$ upon the threads 13, and wedges or secures the members $b$ and $c$ within the body $a$. Assuming that tubing $d$ is being lowered through the casing sections 1 and 2 and the body $a$, an enlargement or collar 15 joining sections of the tubing may pass through the member $a$, said collar 15 forcing the gaskets or packing rings $b$ downwardly, as best illustrated in Figure 2. In this connection it will be noted, assuming one gasket $b$, that the lower face 10 of the member $b$ engages the surface 11 of a spacer $c$ with a portion as 16 of the gasket $b$ engaging at all times the collar 15, while the inner surface 17 of other of said gaskets $b$ engages the periphery of the tubing $d$. It will thus be seen that an effective seal is at all times maintained between the surface of the tubing $d$ or any enlargement or collar 15 carried thereby and the body $a$ or the casing. If any oil were suddenly forced upwardly between the tubing and the casing the pressure would be exerted against the convex surface 10 and the gasket, which would tend to force the gasket into tight engagement with the periphery of the tubing, and if it should so happen that the gasket be forced upwardly from any cause whatsoever, the second gasket immediately above would come into action and it would be necessary to break down all the gaskets before any leak would result. The packing device A as an entirety, may be easily detached from the casing, or in fact, the packing device may be placed at any point in the tubing and be easily detached therefrom by removing the nut 14 and allowing the packing rings and spacers to be removed from the body $a$.

In Figures 3, 4 and 5 adaptations of the invention are shown as applied to the inventions described in pending applications of Charles R. Buther and myself, filed April 11, 1922, Serial No. 551,465, for casing clamps, and filed April 11, 1922, Serial No. 551,466, for casing heads, the essentials of said devices being fully described and set forth in said applications above identified; and in the casing head shown by Figure 3, which casing head includes a body member $e$, a cap member $f$, with means 18 for securing said body and said cap, the packing device A may have its body $a$ secured to the body $e$ of the casing head, as by means of a collar 19. The details of the packing device A are the same as before in the adaptation of Figure 3, the lower end thereof being secured to a casing section 20. Briefly, the casing head has a body portion provided with transverse screw-threaded openings 21 and 22 within which are received ends of pipes 23 and 24. It is intended that these pipes should relieve and act as conduits for any gas that may be formed between the casing and the tubing so as to prevent blow-outs. Obviously the member A being interposed between the body $e$ of the casing head and the casing 20, will effectively prevent any gas escape upwardly between the tubing $g$ and the casing 20. It will thus follow that the device A may operate in conjunction with the features just described for the casing head.

In Figure 4 which illustrates a casing clamp B for holding strings of casing, the casing clamp may include a bottom flanged member $h$, an intermediate or spool member $j$, with a special form of flange body member $k$ for the packing device. In the adaptation shown each string of casing as 25 and 26 is brought up to certain members of the casing clamp, the first casing 25 being carried by the lower flanged member $h$ and the second member 26 being screw-threadedly received within the spool $j$, and it will be noted that between each pair of casings a pressure relief means 27 and 28 are provided. The body member $k$ is formed in two parts, as 29 and 30, each part constituting a half ring provided with flanges 31 and 32. Each part 29 and 30 is internally reduced as shown at 33 and 34 so as to form wall portions 35 and 36. The members 29 and 30 are adapted to cooperate and the flanges 31 and 32 thereof may be seated upon the top of the spool member $j$ being held thereby suitable securing means, as bolts 37 passing through openings in the flanged portion of the spool and in the flange portions of the member $k$. The parts 29 and 30 are further held in work-engaging relation by providing each part respectively with outstanding opposed lugs 38, 39, 40 and 41, the said lugs being bored so as to receive bolts 42 therethrough for effecting a clamping action between the parts 29 and 30. As before stated, the gasket members $b$ alternate with spacer members $m$, being in all respects similar to the spacer members $c$, with the exception that they are in the form of split rings, as shown in Figure 7. To secure the parts $b$ and $m$ in position within the body $k$ a cap member $n$ is provided, there being securing means for securing the cap to the body $k$. Any enlargement or collar upon tubing $p$ may readily pass by or through the packing or gasket $b$ and still maintain a seal. In the construction shown it may be desired to remove the packing device from the spool B and to do this it is only necessary to release the securing means between the top flange of the spool $j$ and the flanges 31 and 32, likewise removing the cap $n$ and the securing means 42, whereupon the parts 29 and 30 of the body $k$ may be separated, leaving simply the gaskets $b$. As the gaskets $b$ are flexible in nature, being formed of rubber or other composition, they may be cut away or left surrounding the tubing $p$. The spacers $m$ of course are readily removed as they are of half ring or split formation.

It will thus be seen that I have provided an extremely effective means for sealing off the space between the tubing and casing or different portions of tubing, or different strings of casing.

It is obvious that various changes and modifications may be made in practicing the invention, in departure from the particular showing, but that such modifications and changes may be made within a fair interpretation of the invention as disclosed, and as defined by the scope of the appended claim.

Having thus disclosed my invention, I claim and desire to secure by Letters Patent:

A device for preventing the passage of oil and gas between concentric tubular members of oil well strings comprising a longitudinally divided body portion of a section of an outer string of said members having an interior shoulder, a plurality of annular gasket members having body portions inclining downwardly toward an inner tubing string and engaging therewith, a plurality of split spacing rings having inclined faces for maintaining the inclined gasket members in spaced relation, and means for holding said gaskets and spacing rings against said shoulder.

In testimony whereof, I have signed my name to this specification.

WILLIAM A. TROUT.